United States Patent Office 3,574,722
Patented Apr. 13, 1971

3,574,722
CARBOXYLATION OF AROMATIC COMPOUNDS
James J. Louvar, Evanston, Ill., assignor to Universal Oil Products Company, Des Plaines, Ill.
No Drawing. Filed Mar. 20, 1968, Ser. No. 714,430
Int. Cl. C07c 63/04, 101/54
U.S. Cl. 260—515                                  10 Claims

ABSTRACT OF THE DISCLOSURE

Aromatic compounds may be carboxylated by treating the compound with a solution of boron trifluoride in a carboxylic acid to form carboxylated aromatic compounds.

---

This invention relates to a process for the carboxylation of aromatic compounds, and particularly to a process whereby a carboxyl group is introduced into the nucleus on an aromatic compound utilizing an acid-acting catalyst and a carboxylic acid.

Aromatic compounds, whether substituted or unsubstituted in nature, which contain a carboxyl radical on the nucleus thereof will find a wide variety of uses in the chemical field. One of the most important of these carboxylated aromatic compounds comprises p-toluic acid. This compound is a precursor of terephthalic acid, said terephthalic acid being an important intermediate in the preparation of synthetic fibers, resins, and films, especially when combined with glycols. In addition, the aminobenzoic acids such as ortho-aminobenzoic acid (anthranilic acid), meta-aminobenzoic acid, and paraamidobenzoic acid, are all useful as intermediates in the preparation of dyes of pharmaceuticals. Likewise, the isomeric nitrobenzoic acids are useful in organic synthesis, in the preparation of anesthestics, and as intermediates in the manufacture of dyes and sun-screening agents. Another carboxylated aromatic compound comprising ortho- or para-chlorobenzoic acid, is used as an intermediate for the preparation of dyes, fungicides, pharmaceuticals, and other organic chemicals.

It is therefore an object of this invention to provide a novel process for the carboxylation of aromatic compounds.

A further object of this invention is found in a process for treating an aromatic compound with a carboxylic acid in the presence of an acid-acting catalyst.

In one aspect an embodiment of this invention resides in a process for the carboxylation of an aromatic compound which comprises contacting an aromatic compound with a solution of boron trifluoride in carboxylic acid at condensation conditions, and recovering the resultant carboxylated aromatic compound.

A specific embodiment of this invention is found in a process for the carboxylation of an aromatic compound which comprises contacting toluene with a solution of boron trifluoride in acetic acid at a temperature in the range of from about 100° to about 250° C. and at a pressure in the range of from about atmospheric to about 100 atmospheres, and recovering the resultant toluic acids.

Other objects and embodiments will be found in the following further detailed description of the present invention.

The present invention is primarily concerned with a process for the carboxylation of aromatic compounds. The term "aromatic compounds" is used in the present specification and appended claims will refer to monocyclic and polycyclic aromatic compounds which may be substituted or unsubstituted in nature, specific examples of these compounds being hereinafter set forth in greater detail. The carboxylation of the aromatic compounds is effected by treating said aromatic compounds with a saturated solution of boron trifluoride in a carboxylic acid at condensation conditions. These condensation conditions will include an elevated temperature in the range of from about 100° to about 250° C. and a pressure in the range of from about atmospheric to about 100 atmospheres. The necessary pressure will be supplied by introducing an inert gas such as nitrogen into the reaction vessel until the desired pressure has been reached, said pressure being that which is sufficient to maintain a major portion of the reactant in the liquid phase.

Examples of carboxylic acids which may be used will include both monocarboxylic and polycarboxylic acids either unsaturated in nature. Some specific examples of these acids will include fatty acids such as formic acid, acetic acid, propionic acid, butyric acid, valeric acid, caproic acid, enathylic acid, etc.; unsaturated acids such as acrylic acid, the butenic acids, such as crotonic acid, isocrotonic acid, vinylacetic acid, methylacrylic acid, the pentenic acids such as tiglic acid, angelic acid, senecioic acid, the hexenic acids, etc.; the acetylene acids such as propynoic acid, tetroloic acid, penteinoic acid, etc.; dicarboxylic acids such as the oxalic acids including oxalic acid, malonic acid, succinic acid, glutaric acid, adipic acid, pinelic acid, suberic acid, etc.; the pumaric acids such as pumaric acid, maleic acid, glutaconic acid, citraconic acid, itaconic acid, ethidenemalonic acid, mesaconic acid, allylmalonic acid, proplyidenemalonic acid, hydromuconic acid, pyrocinchonic acid, allylsuccinic acid, tetraconic acid, etc. It is to be understood that the aforementioned acids are only representative of the class of acids which may be used and that the present invention is not necessarily limited thereto.

Examples of aromatic compounds which may be used as the starting material of the process of this invention will comprise both monocyclic and polycyclic aromatic compounds which may be unsubstituted or which may contain a substituent selected from the group consisting of alkyl containing from about 1 to about 20 carbon atoms, aryl, alkaryl, aralkyl, cycloalkyl, alkoxy, halogen, nitro, amino, heterocyclic, etc. radicals. Some specific examples of these compounds will include benzene, toluene, ethylbenzene, n-propylbenzene, isopropylbenzene (cumene), n-butylbenzene, t-butylbenzene, etc.; phenylbenzene, m-tolylbenzene, o-tolylbenzene, p-tolylbenzene, o-ethylphenylbenzene, m-ethylphenylbenzene, p-ethylphenylbenzene, diphenylmethane, diphenylethane, diphenylpropane, etc.; cyclopentylbenzene, cyclohexylbenzene, cycloheptylbenzene, etc.; anisole, phenetole, propylphenyl ether, isopropylphenyl ether, butylphenyl ether, etc.; chlorobenzene, bromobenzene, iodobenzene, aniline, nitrobenzene, 1-methylnaphthalene, 2-methylnaphthalene, 4-methylnaphthalene, 1-ethylnaphthalene, 2-ethylnaphthalene, 4-ethylnaphthalene, 1-propylnaphthalene, 2-propylnaphthalene, 4 - propylnaphthalene, 1 - phenylnaphthalene, 2-phenylnaphthalene, 4-phenylnaphthalene, 1-benzylnaphthalene, 2 - benzylnaphthalene, 4-benzylnaphthalene, 1-(o-tolyl) naphthalene, 1 - (m-tolyl)naphthalene, 1-(p-tolyl)naphthalene, 2-(o-tolyl)naphthalene, 2-(m-tolyl)naphthalene, 2-(p-tolyl)naphthalene, 4-(o-tolyl)naphthalene, 4 - (m-tolyl)naphthalene, 4 - (p-tolyl)naphthalene, 1 - methoxynaphthalene, 2 - methoxynaphthalene, 4 - methoxynaphthalene, 1-ethoxynaphthalene, 2 - ethoxynaphthalene, 4-ethoxynaphthalene, 1 - propoxynaphthalene, 2 - propoxynaphthalene, 4 - propoxynaphthalene, 1 - chloronaphthalene, 2 - chloronaphthalene, 4 - chloronaphthalene, 1-bromonaphthalene, 2 - bromonaphthalene, 4 - bromonaphthalene, 1 - nitronaphthalene, 2 - nitronaphthalene, 4 - nitronaphthalene, 1-aminonaphthalene, 2-aminonaphthalene, 4 - aminonaphthalene, etc.; the correspondingly substituted anthracenes, phenanthrenes, chrysenes, pyrenes, etc. It is to be understood that the aforementioned aromatic compounds are only representative of the class of compounds which may be carboxylated, and that the present invention is not necessarily limited thereto.

The process of this invention may be effected in any suitable manner and may comprise either a batch or continuous type operation. For example, when a batch type operation is used, a quantity of the aromatic compound which is to be carboxylated and the saturated solution of boron trifluoride in a carboxylic acid of the type hereinbefore set forth in greater detail are placed in an appropriate apparatus which may comprise a flask, or if superatmospheric pressures are to be employed, an autoclave of the rotating or mixing type. In the latter case, the autoclave is sealed, pressured with a substantially inert gas such as nitrogen until the desired operating pressure is reached, and thereafter heated to the predetermined operating temperature. The vessel and contents thereof are maintained at the desired operating temperature for a residence time which may range from about 0.5 up to about 10 hours or more in duration. At the end of the reaction time, the vessel and contents thereof are then allowed to return to room temperature, any excess pressure is discharged, and the reaction mixture is recovered. The reaction mixture is then treated in a conventional manner such as washing with water, extraction with a solvent, filtration, fractional distillation, fractional crystallization, etc. whereby the carboxylated aromatic compound is separated and recovered.

It is also contemplated within the scope of this invention that the process may also be effected in a continuous manner of operation. When this type of operation is used, a reaction vessel is maintained at the proper operating conditions of temperature and pressure. The aromatic compound which is to undergo carboxylation is continuously charged to the reactor while the saturated solution of boron trifluoride in a carboxylic acid is also continuously charged thereto through a separate stream. If so desired, the reactants comprising the aromatic compound to be carboxylated and the saturated solution of boron trifluoride in a carboxylic acid may be admixed prior to entry into said reactor and charged thereto in a single stream. Upon completion of the desired residence time, the reactor effluent is continuously withdrawn and subjected to separation means whereby the unreacted aromatic compound and saturated solution of boron trifluoride in a carboxylic acid are separated from the desired carboxylated aromatic compound, the latter being recovered while the former two reactants are recycled to form a portion of the feed stock.

Examples of carboxylated aromatic compounds which may be prepared according to the process of this invention will include benzoic acid, o-toluic acid, m-toluic acid, p-toluic acid, o-ethylbenzoic acid, m-ethylbenzoic acid, p-ethylbenzoic acid, o-propylbenzoic acid, m-propylbenzoic acid, p-propylbenzoic acid, o-isopropylbenzoic acid, m-isopropylbenzoic acid, p-isopropylbenzoic acid, o-phenylbenzoic acid, m-phenylbenzoic acid, p-phenylbenzoic acid, o-(p-tolyl)benzoic acid, m-(p-tolyl)-benzoic acid, p-(p-tolyl)benzoic acid, o-cyclopentylbenzoic acid, m-cyclopentylbenzoic acid, p-cyclopentylbenzoic acid, o-chlorobenzoic acid, m-chlorobenzoic acid, p-chlorobenzoic acid, o-bromobenzoic acid, m-bromobenzoic acid, p-bromobenzoic acid, o-aminobenzoic acid, m-aminobenzoic acid, p-aminobenzoic acid, o-nitrobenzoic acid, m-nitrobenzoic acid, p-nitrobenzoic acid, o-methoxybenzoic acid, m-methoxybenzoic acid, p-methoxybenzoic acid, o-ethoxybenzoic acid, m-ethoxybenzoic acid, p-ethoxybenzoic acid, naphthoic acid, 2-methylnaphthoic acid, 2-ethylnaphthoic acid, 4-methylnaphthoic acid, 4-ethylnaphthoic acid, etc. It is to be understood that the aforementioned carboxylated aromatic compounds are only representative of the compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example 41 grams (0.5 mole) of toluene and 50 grams of a 50% solution of boron trifluoride in acetic acid were placed in the glass liner of a rotating autoclave. The liner was sealed into the autoclave and nitrogen pressed in until an initial pressure of 75 pounds per square inch was reached. The autoclave was then heated to a temperature of about 125° C., maintained at this temperature and rotated for a period of 4 hours. At the end of this time, the autoclave and contents thereof were allowed to cool to room temperature, the excess pressure was discharged, and the reaction product was recovered. The product was then washed with water and extracted with benzene. The aqueous layer was separated from the organic layer. The organic layer was then filtered and heated in a rotating film evaporator at reduced pressure to remove the benzene solvent. The desired product comprised p-toluic acid having a melting point of 173° C. The acid was identified by means of an infrared analysis.

EXAMPLE II

In this example toluene, boron trifluoride, and acetic acid in a mole ratio of toluene:boron trifluoride:acetic acid of 0.5:0.5:0:75 were placed in the glass liner of a rotating autoclave. The autoclave was heated to a temperature of 150° C. at autogeneous pressures for a period of 4 hours. At the end of this time, the autoclave was allowed to return to room temperature and the product was treated in a manner similar to that set forth in Example I above. The desired product comprising p-toluic acid was recovered and identified by means of infrared analysis.

EXAMPLE III

A mixture of 53 grams (0.5 mole) of ethylbenzene and 50 grams of a 50% solution of boron trifluoride in acetic acid is placed in the glass liner of a rotating autoclave. The autoclave is sealed and nitrogen is pressed in until an initial pressure of 100 pounds per square inch is reached. The autoclave is then heated to a temperature of 150° C. and maintained thereat for a period of 4 hours with constant rotation. At the end of this time, the autoclave and contents thereof are allowed to return to room temperature, the excess pressure is discharged and the reaction mixture is recovered. The mixture is then water washed and extracted with benzene. The aqueous layer is separated from the organic layer, following which the latter is filtered and the benzene solvent is removed by evaporation. The desired product comprising a mixture of ethylbenzoic acids is separated and recovered from the remaining product.

EXAMPLE IV

In this example a mixture of 46.5 grams (0.5 mole) of aniline and 50 grams of a 50% solution of boron trifluoride in propionic acid is placed in the glass liner of a rotating autoclave. The autoclave is sealed and nitrogen is placed in until an initial pressure of 100 pounds per square inch is reached. Following this, the autoclave is heated to a temperature of 150° C. and maintained thereat for a period of about 4 hours, while maintaining a constant rotation of the autoclave. At the end of this time, the autoclave and contents thereof are allowed to return to room temperature, the excess pressure is discharged and the autoclave is opened. The reaction product is recovered, washed with water, and extracted with benzene. The aqueous layer is separated from the organic layer, following which, the latter is then treated to remove the solvent. The remaining product is then subjected to fractional distillation under reduced pressure and the desired product comprising a mixture of aminobenzoic acids is separated out and recovered.

EXAMPLE V

A mixture of 64 grams (0.5 mole) of naphthalene and 50 grams of a 50% solution of boron trifluoride in butyric acid is placed in the glass liner of a rotating autoclave and treated in a manner similar to that set forth in Example I above. The reaction mixture which is recovered after the treatment is water washed and extracted with benzene. The phases are separated and the solvent is removed from the reaction product by evaporation. The remaining product is subjected to fractional distillation under reduced pressure and the desired product comprising naphthoic acid is recovered.

EXAMPLE VI

In this example 61 grams (0.5 mole) of nitrobenzene and 50 grams of a 50% solution of boron trifluoride in acetic acid are placed in the glass liner of a rotating autoclave. The liner is sealed into the autoclave and pressured to 75 pounds per square inch by introducing nitrogen into the autoclave. Following this, the apparatus and contents thereof are heated to a temperature of 150° C. and maintained thereat for a period of 4 hours while rotating the vessel. At the end of this residence time, the autoclave and contents thereof are allowed to return to room temperature, the excess pressure is discharged and the reaction mixture is recovered. The mixture is then washed with water and extracted with a benzene solvent. The aqueous layer is separated from the organic layer, following which the benzene solvent is removed from said organic layer by evaporation. The remaining product is then subjected to fractional distillation under reduced pressure whereby the desired product comprising a mixture of nitrobenzoic acids is separated and recovered.

I claim as my invention:

1. A process for the carboxylation of an aromatic compound which comprises contacting an aromatic compound with a solution of boron trifluoride in carboxylic acid at condensation conditions, and recovering the resultant carboxylated aromatic compound.

2. The process as set forth in claim 1, further characterized in that said condensation conditions include a temperature in the range of from about 100° to about 250° C. and a pressure in the range of from about atmospheric to about 100 atmospheres.

3. The process as set forth in claim 1, further characterized in that said carboxylic acid comprises acetic acid.

4. The process as set forth in claim 1, further characterized in that said carboxylic acid comprises propionic acid.

5. The process as set forth in claim 1, further characterized in that said carboxylic acid comprises butyric acid.

6. The process as set forth in claim 3, further characterized in that said aromatic compound comprises toluene and said carboxylated aromatic compound comprises toluic acids.

7. The process as set forth in claim 3, further characterized in that said aromatic compound comprises ethylbenzene and said carboxylated aromatic compound comprises ethylbenzoic acids.

8. The process as set forth in claim 4, further characterized in that said aromatic compound comprises aniline and said carboxylated aromatic compound comprises aminobenzoic acids.

9. The process as set forth in claim 5, further characterized in that said aromatic compound comprises naphthalene and said carboxylated aromatic compound comprises naphthoic acid.

10. The process as set forth in claim 3, further characterized in that said aromatic compound comprises nitrobenzene and said carboxylated compound comprises nitrobenzoic acids.

References Cited

Fieser, L. F., Reagents for Organic Synthesis, pub. by Wiley and Sons, Inc., New York, QD262 p. 5 C-3 (1967).

LORRAINE A. WEINBERGER, Primary Examiner

L. A. THAXTON, Assistant Examiner

U.S. Cl. X.R.

260—518, 520, 521